3,015,611
LOW DENSITY WHEY-BOUND TABLETS
Max Smedresman, Queens Village, N.Y., assignor to Nysco Laboratories, Inc., Long Island City, N.Y., a corporation of New York
No Drawing. Filed Aug. 25, 1959, Ser. No. 835,827
5 Claims. (Cl. 167—82)

The present invention relates generally to improvements in molded products, and it relates particularly to improvements in tablets, pills or the like and to improved methods for producing the same.

The conventional method of manufacturing tablets for pharmaceutical or other uses includes the steps of producing granules of predetermined size of the material forming the tablets and compressing the material into a coherent mass of the shape of the finished tablet. The common methods of producing the granules of suitable size and configuration are the so-called slugging process and wet granulating process. Both these processes possess many disadvantages and leave much to be desired.

In accordance with the slugging process, the various ingredients, in intimately admixed powder form, are subjected to high pressures to produce large slugs of the material as a cohered solid mass. These slugs are then milled into granules of the desired size and configuration, the granules being thereafter recompressed in the conventional tablet-forming equipment to produce the finished product. The slugging process is generally employed where the tablet ingredients may not be wetted due to some incompatibility or where they are heat-sensitive and unstable. It is an expensive process which involves considerable labor and equipment and its application is limited and not always satisfactory.

The more common method is the wet granulating process. In accordance with this process, the ingredients which enter into the tablet are wetted down. The wetting agent generally consists of water, alcohol or other organic solvent with or without water, gum or other binder solutions, for example, acacia, tragacanth, methyl cellulose, gelatin, gelatinized starch, etc. The tablet ingredients, wetted as above, to the proper consistency are placed in a suitable drying oven. The dried solid cohered mass is then milled into granules of the required size, admixed with a suitable lubricant and formed into tablets as in the case of the slugging process. The wet granulating process is likewise expensive, requiring considerable labor, equipment and expenditure of energy. Moreover, where organic solvents are employed, these are evaporated and seldom recovered, thus adding to the production costs. The wet granulating process cannot be used when the tablet ingredients are incompatible to wetting or are heat-sensitive.

It is thus a principal object of the present invention to provide an improved molded product and an improved method for producing the same.

Another object of the present invention is to provide improved pills, tablets and the like, and an improved method for producing the same.

Still another object of the present invention is to provide an improved pill and tablet producing process characterized by its simplicity, flexibility, versatility, low cost, minimum equipment requirements, low energy consumption and minimium labor requirements.

A further object of the present invention is to provide a pill, tablet, or the like capable of carrying a wide range and large proportion of active ingredients, and characterized by its low cost and ease of production.

It has been discovered that by employing milk whey as a matrix or binder in the production of pills or tablets, the preparatory steps necessary with the conventional pill and tablet producing methods are obviated and all that is necessary is that the milk whey be mixed with the active ingredients and in certain cases with a minimum of other additives, and fed directly to the conventional tableting press and therein molded to the desired size and shape. As little as approximately 30% by weight of the tablet may be milk whey which may be the sole binder, and as much as 100% milk whey may be employed with the active ingredients being absent or present in only trace amounts. The active ingredient may be almost any pharmaceutically active material, since these are substantially all compatible with the whey or may be any other desirable material when the tablet is not used for medicinal purposes.

The milk whey is initially in expanded form and advantageously of the spray dried type. An example of a milk whey which has been satisfactorily employed is "Krafen," a spray-dried sweet whey marketed by Kraft Foods and having a bulk density of about 100 pounds per 2.2 cubic foot. The spray-dried whey is characterized by being free flowing, easily compressible and readily admixable with other ingredients while maintaining its high flow properties thereby to permit the satisfactory feeding and handling of the mixture in the tableting machine.

In producing the tablets, the active ingredients are merely intimately admixed, by any well known apparatus, with at least 30% by weight of the end product consisting of whey and with, where necessary, a small quantity of any well known lubricant such as talc or magnesium stearate or mixtures thereof and any desirable excipients and other additives.

The resulting mixture is then fed to the conventional tableting machine where tablets of the desired sizes and shapes are molded in the conventional manner, employing molding pressures between ¼ ton and 3 tons per square inch. The optimum pressure in each specific case is readily determined by the feel of the tablet in manner well known in the art. The density of the whey in the finished tablet is advantageously between 61 to 73 lbs. per cubic foot. The proper compression may not be readily achieved with certain ingredients, and in such cases it has been found that the addition of dicalcium phosphate anhydrous to the mixture, preferably in the range of about 1% to 20%, for example 10%, by weight of the resulting mixture greatly facilitates the production of the tablets.

In addition to the milk whey unexpectedly functioning as a tablet bond or matrix with the superior properties set forth above, it is characterized by the further advantages of being very low in cost, non-hygroscopic, having a bland taste and having a better disintegration time than the conventional tablets. The whey matrix tablet affords a chewable smooth base having a naturally bland taste which may be readily masked and being compatible with flavoring and sweetening agents. In the conventional tableting methods where some of the ingredients cannot be granulated, they are added to a neutral base granulation and compressed therewith. However, some segregation of the active materials occurs due to a variance in the mesh sizes of the actives and inactives resulting in many drawbacks including difficulties in assay. It has been found that where milk whey is employed as the matrix material, the above drawbacks are overcome in that the active material tends to cling or adhere to the whey thereby to minimize or practically completely eliminate the aforesaid segregation or separation. It is apparent from the above that the use of whey as a binding agent or matrix for tablets is accompanied by many unexpected advantages. All of the drying, heating and grinding steps and some of the mixing steps are completely eliminated along with the equipment and labor therefor and the power and energy consumed thereby and the space required therefor. The production method is more flexible, being applicable to a larger range of active ingredients and results in a superior and less expensive product.

The following examples are merely given, by way of illustration, of mixtures which may be employed in practicing the present invention and in producing the improved tablet. The various ingredients are thoroughly admixed in any suitable well known equipment and the resulting mixture is fed to a conventional tableting press and molded in the manner above set forth:

*Example 1*

The following formula, which typifies the present process in the production of tablets containing a botanical active material, resulted in about 3,125,000 tablets having a total weight of 1,250 pounds, and a unit table weight of 2.8 grains; each tablet contained 50 mgm. of *Rauwolfia serpentina*:

| | |
|---|---|
| *Raulwolfia serpentina* powdered root | 343 lbs., 12 ozs. |
| Whey powder | 818 lbs., 4 ozs. |
| Dicalcium phosphate anhydrous | 10 lbs. |
| Talc | 8 lbs. |

The above ingredients were intimately admixed in a conventional dry mixer and fed to the tableting press in the usual manner.

*Example 2*

The following formula was employed in the production of tablets containing a glandular active material:

| | Lbs. |
|---|---|
| Thyroid powder, triple strength, U.S.P | 20 |
| Whey powder | 55 |
| Dicalcium phosphate | 21 |
| Talcum | 6 |

Upon intimate mixing of these ingredients, the mixture was tableted as aforesaid. Approximately 420,000 tablets were produced, the unit tablet weight being 1.7 grains and the thyroid content per tablet being 1 grain, the aggregate weight of the tablets being 102 pounds.

*Example 3*

A formula employing a mixture of chemicals as the active ingredient is as follows:

| | |
|---|---|
| Caffeine alkaloid | 118 lbs., 13 ozs., 205 grains. |
| Phenylpropanolamine HCl | 99 lbs. |
| Iron (as ferrous sulfate) | 44 lbs., 7 ozs. |
| Copper (as copper sulfate) | 9 ozs. |
| Iodine (as potassium iodide) | 3 ozs., 83 grains. |
| Manganese (as manganese sulfate) | 39 lbs., 10 ozs., 410 grains. |
| Whey powder | 700 lbs. |
| Dicalcium phosphate | 170 lbs., 5 ozs., 426 grains. |
| Corn starch | 36 lbs. |
| Talc | 20 lbs. |
| Magnesium stearate | 5 lbs. |

An intimate mixture of the above was tableted as earlier set forth to produce about 1,800,000 tablets having a running weight of 4.8 grains per tablet, and a total weight of 1,234 pounds, 4 ounces and 250 grains.

The above are given merely as illustrative examples and are not intended to limit the scope of the present invention. For example, tablets may be products employing 100% of the spray dried whey in the absence of any additives and the active ingredients may be present in only trace of micrograin amounts. Furthermore, as little as about 30% whey may be employed as the binder. As active materials, any ingredient may be employed which has heretofore been tableted by conventional methods as well as any ingredient which is compatible with the whey. It should be pointed out that the whey employed in the above examples was the above-identified "Krafen" which had the following approximate analysis:

| | Percent |
|---|---|
| Milk sugar | 72. |
| Protein | 12.5 |
| Ash (total) | 9.0 |
| Butterfat | 0.5 |
| Lactic acid | 1.5 |
| Total solids | 95.5 |

It is important to note that while lactose itself has been employed in tablets, the conventional procedure was required to produce the tablets including the granulating, grinding and other steps.

While there have been described preferred embodiments of the present invention, it is apparent that numerous alterations, omissions and additions may be made without departing from the spirit thereof.

I claim:

1. The improved method of producing a tablet comprising intimately admixing low density milk whey in expanded powder form with an active ingredient in the substantial absence of added water and in the absence of granulation to produce a mixture containing at least 30% by weight of said whey shaping said mixture into tablets under sufficient pressure to compress said whey into an adherent mass containing said active ingredient.

2. The improved method in accordance with claim 1, wherein said expanded whey powder has a bulk density of approximately 100 pounds per 2.2 cubic foot.

3. The method in accordance with claim 1, wherein said pressure is between ¼ ton and 3 tons per square inch.

4. The method in accordance with claim 1, including the addition of a lubricant to said mixture.

5. The method in accordance with claim 1, including the addition to said mixture of from 1% to 20% by weight of said mixture of dicalcium phosphate.

References Cited in the file of this patent

UNITED STATES PATENTS

| | | |
|---|---|---|
| 2,627,463 | Meade | Feb. 3, 1953 |
| 2,835,583 | Higgins | May 20, 1958 |
| 2,921,854 | Parker | Jan. 19, 1960 |

FOREIGN PATENTS

| | | |
|---|---|---|
| 134,366 | Australia | Sept. 21, 1959 |

OTHER REFERENCES

Manufacture of Compressed Tablets, by Silver et al., 1944, F. J. Stoker Machine Co., p. 34.

Remington Practice of Pharmacy, Martin and Cook, Eleventh Edition, 1956, p. 377.